United States Patent [19]

James et al.

[11] Patent Number: 4,751,161
[45] Date of Patent: Jun. 14, 1988

[54] NON-AQUEOUS PRIMARY CELL

[75] Inventors: Stanley D. James, Bethesda; Patricia H. Smith, Colesville; Kathleen M. O'Neill, Bethesda, all of Md.; Michael H. Wilson, Washington, D.C.

[73] Assignee: The United States of America as represented by the Secretary of the Navy, Washington, D.C.

[21] Appl. No.: 870,213

[22] Filed: May 29, 1986

[51] Int. Cl.⁴ .................................... H01M 6/16
[52] U.S. Cl. .................................. 429/197; 429/199
[58] Field of Search ............... 429/197, 198, 196, 194, 429/199, 105, 212

[56] References Cited

U.S. PATENT DOCUMENTS

| | | | |
|---|---|---|---|
| 4,221,851 | 9/1980 | Faust et al. | 429/197 |
| 4,224,389 | 9/1980 | Peled | 429/194 |
| 4,252,875 | 2/1981 | Venkatasetty | 429/199 X |
| 4,439,503 | 3/1984 | Doddapaneni | 429/194 X |
| 4,452,872 | 6/1984 | Klinedinst et al. | 429/196 X |
| 4,469,763 | 9/1984 | Walsh et al. | 429/101 |
| 4,613,551 | 9/1986 | Doddapaneni | 429/196 X |

*Primary Examiner*—Anthony Skapars
*Attorney, Agent, or Firm*—Kenneth E. Walden; Roger D. Johnson

[57] ABSTRACT

A non-aqueous lithium electrochemical cell which includes a halocarbon cathode depolarizer which is 1,2-dichloroethane, 1,1,2-trichloroethane, 1,1,2,2-tetrachloroethane, 1,2-dichloro-1,1-difluoroethane or mixtures thereof and a cathode catalyst which is
copper,
rhodium,
palladium,
cobalt phthalocyanine,
nickel phthalocyanine,
iron phthalocyanine,
a cobalt tetraaza-[14]-annulene,
a nickel tetraaza-[14]-annulene,
a iron tetraaza-[14]-annulene,
a cobalt porphyrin,
a nickel porphyrin,
a iron porphyrin, or a mixture thereof.

16 Claims, 1 Drawing Sheet

NON-AQUEOUS PRIMARY CELL

BACKGROUND OF THE INVENTION

This invention relates to electrochemical cells and especially to high-energy, liquid cathode, non-aqueous lithium electrochemical cells free from highly toxic materials.

Since the 1950's a great deal of research has been done to raise the specific energy of batteries. Higher energy chemicals were employed for the electrode materials and of course much more stable electrolytes had to be found to withstand these strongly oxidizing and reducing chemicals. The relatively easily decomposed water of aqueous batteries was replaced by inert, aprotic solvents both organic and inorganic. Suitable electrolytes were identified combining sufficient conductance and electrochemical stability. Because of its low equivalent weight, strong reducing power, relatively high melting point and good rate capability, lithium emerged as the favored anode material and was coupled with a variety of solid and liquid oxidants. In the 1970's the $Li/SO_2$ and $Li/SOCl_2$ liquid-cathode batteries were confidently promoted as combining both high specific energy and power. Compared with the aqueous batteries, almost an order of magnitude increase in specific energy was achieved together with superior storability, constancy of voltage, and low temperature operation.

However, as industry delivered large numbers of these $SO_2$ and $SOCl_2$ batteries to U.S. Government agencies for test and use, some serious safety problems became evident. During use or storage the batteries would occasionally ignite or explode venting toxic gases. Consequently, their use became restricted and in some cases prohibited. The chemical events triggering the observed hazards are quite complex and still puzzle researchers. Intensive study has focused on clarifying these hazard mechanisms to allow the safe harnessing of high energy lithium batteries. Researchers are also exploring alternate cathode materials that are completely new and potentially superior to $SO_2$ and $SOCl_2$ in terms of both safety and efficiency.

One such effort is the work of Peled (U.S. Pat. No. 4,224,389). He circumvents the corrosiveness and toxicity of $SO_2$ and $SOCl_2$ by using aprotic, reducible, organic compounds free from these drawbacks. The cathode materials listed in his Examples comprise four haloethanes and propylene glycol-1,2-sulfite with butyrolactone and tetrahydrofuran as cosolvents and lithium perchlorate, tetrafluoroborate and chloride as conducting salts. A serious inadequacy of Peled's cathode materials however is their low, delivered coulombic capacity. For his six Examples of the above five depolarizers, cathode capacities ranged from 0.02 to 0.2 Ah per ml of carbon current collector at 2.3 V versus a Li anode. This compares unfavorably with the 0.8 to 1.2 Ah per ml at 3.0 V routinely obtained from $Li/SOCl_2$ cathodes. Another attempt in the same direction was made by Doddapaneni (U.S. Pat. No. 4,439,503). He employed N,N-dichloroethyl carbamate as cathode depolarizer, no cosolvent and tetraalkylammonium perchlorate and lithium hexafluoroarsenate as conducting salts. His patent emphasized the sulfur-free nature of this depolarizer and its likely freedom from the thermal runaway hazards that have been associated with elemental sulfur produced in discharged $SO_2$ and $SOCl_2$ batteries. It would be desirable to produce safe, stable, sulfur-free lithium batteries having greater cathode capacities.

SUMMARY OF THE INVENTION

Accordingly, it is an object of this invention to provide a new non-aqueous high energy lithium battery.

Another object of this invention is to provide a non-aqueous lithium battery which can be safely stored.

A further object of this invention is to provide a non-aqueous lithium battery which does not ignite or explode.

Still another object of this invention is to provide a non-aqueous lithium battery which will not explode and vent out toxic gases.

Still another object of this invention is to provide a safe non-aqueous lithium battery which has a high output voltage and a high storage capacity.

These and other objects of this invention are achieved by providing
a non-aqueous electrochemical cell comprising
 a. a lithium anode;
 b. a non-aqueous electrolyte comprising
  (1) a lithium electrolyte salt, and
  (2) a solvent mixture comprising
   (a) a halocarbon solvent cathode depolarizer, and
   (b) an inert, slightly polar cosolvent which increases the solubility of the lithium electrolyte salt;
 c. a catalyzed carbon cathode comprising from more than zero to 30 weight percent of a catalyst selected from the group consisting of:
copper,
rhodium,
palladium,
cobalt phthalocyanine,
nickel phthalocyanine,
iron phthalocyanine,
cobalt tetraaza-[14]-annulenes,
nickel tetraaza-[14]-annulenes,
iron tetraaza-[14]-annulenes,
cobalt porphyrins,
nickel porphyrins,
iron porphyrins, and mixtures thereof; and
 d. a separator between the anode and the cathode.

BRIEF DESCRIPTION OF THE DRAWINGS

FIGS. 1 and 2 are more fully discussed in the experimental section.

DETAILED DESCRIPTION OF THE PREFERRED EMBODIMENT

Figure 1:
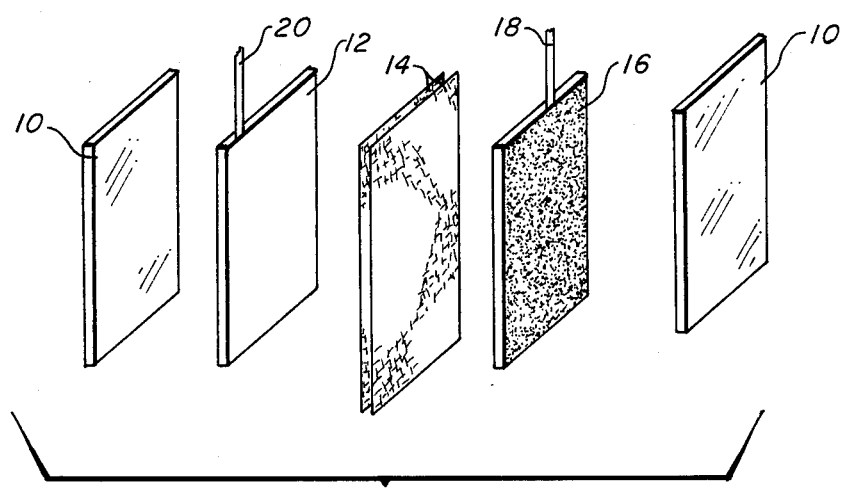
FIG. 1 is an exploded view of the parts of a typical cell used to test the components of this invention.

The critical features of this invention is the combination of an electrolyte containing a selected halocarbon cathode depolarizer and a catalyzed-carbon cathode containing a selected cobalt, nickel, or iron macrocylic ligand catalyst and a conventional Teflon binder.

The halocarbon cathode-depolarizer is selected to provide a safe, stable, long life high energy lithium battery. In general, iodocarbons and bromocarbons are too reactive to produce the desired stability in the present battery system. As a result, chlorocarbons and chlorofluorocarbons are selected as the halocarbons to provide the stable, energetic lithium battery of this invention. Preferred halocarbons include 1,2-dichloroethane, 1,1,2-trichloroethane, 1,1,2,2-tetrachloroethane, and 1,2-dichloro-1,1-difluoroethane. More preferred are 1,2-dichloroethane, 1,1,2-trichloroethane, and 1,1,2,2-tetrachloroethane, with 1,1,2,2-tetrachloroethane being the most preferred. Note that halocarbons containing trichloromethyl groups (—CCl$_3$), as for example 1,1,1-trichloroethane, are generally too reactive to produce stable batteries according to this invention.

A conventional inorganic lithium salt is added to the halocarbon to provide conductivity between the anode and cathode in the battery. In the examples, infra, lithium hexafluoroarsenate (LiAsF$_6$) is used with good results. The limited solubility of the highly polar inorganic lithium salts in the non-polar halocarbons presents a problem. This is overcome by adding an inert, slightly polar cosolvent to the halocarbon to increase the solubility of the lithium salt without interfering with the reduction reaction at the cathode. Examples of these inert, slightly polar cosolvents include tetrahydrofuran (THF) and methyl formate, with methyl formate being preferred at lower temperatures and higher discharge rates. In general the volume ratio of halocarbon to cosolvent will be from about 50:50 to about 75:25, with the former favoring high rate discharge and the latter favoring high capacity discharge.

The concentration of lithium electrolyte salt in the halocarbon-cosolvent solution is chosen according to conventional means to maximize conduction. In general, the molarity of lithium salt in the lithium salt-halocarbon-cosolvent electrolyte will be from about 0.5 to about 2.0M, and preferably from 1.0 to 1.5M.

Catalysts which may be used include finely-divided copper, rhodium, and palladium metals and macrocyclic ligand, organometallic complexes of cobalt, nickel, and iron such as cobalt phthalocyanine, nickel phthalocyanine, ironphthalocyanine, cobalt tetraaza-[14]-annulenes, nickel tetraaza-[14]-annulenes, iron tetraaza-[14]annules, cobalt porphyrins, nickel porphyrins, and iron porphyrins. Specific examples are cobalt phthalocyanine, nickel phthalocyanine, iron phthalocyanine, cobalt dibenzotetraaza-[14]-annulene, nickel dibenzotetraaza-[14]-annulene, iron dibenzotetraaza-[14]-annulene, cobalt 4,4'dimethoxydibenzotetraaza-[14]-annulene, nickel 4,4'-dimethoxydibenzotetraaza-[14]-annulene, iron 4,4'-dimethoxydibenzotetraaza-[14]-annulene, cobalt tetramethoxyphenylporphryrin, nickel tetramethoxyphenylporphyrin, and iron tetramethoxyphenylporphyrin. The cobalt complexes are preferred because they produce electrochemical cells with higher output voltages. Specifically the following catalysts are preferred: cobalt phthalocyanine, cobalt dibenzotetraaza-[14]-annulene, cobalt 4,4'-dimethoxydibenzotetraaza-[14]-annulene, and cobalt tetramethoxyphenylporphyrin. Most preferred as the catalyst is cobalt dibenzotetraaza-[14]-annulene (CoTAA).

The catalyst comprises from more than zero to about 30, preferably from 2 to 15, and more preferably from 5 to 10 weight percent of the catalyst-carbon-Teflon portion of the electrode. A conventional amount of binder (e.g., Teflon) sufficient to hold the catalyst-carbon-binder mixture together is used. About 4 to 6 weight percent will work well with about 5 percent being preferred. The remainder of the catalysts-carbon-binder (Teflon) mixture is carbon black which provides paths of electrical conduction between the catalyst and the current collector of the electrode.

The catalyzed-carbon electrode is manufactured by conventional techniques. The examples, infra, illustrate a typical method of preparing the electrode. Finely divided particles of the catalyst, carbon black (e.g., Shawinigan acetylene black), and a binder (e.g., about 5 weight percent of Teflon: polytetrafluoroethylene) are blended in a hydrocarbon (e.g., Stoddards Solvent) medium then filtered, worked down into a thin sheet, dried and cured. The resulting catalyst-carbon sheet can then be mounted on metal (e.g., nickel) current collectors.

In summary the completed lithium battery of this invention will comprise: a conventional lithium anode; a conventional separator; an electrolyte comprising a lithium electrolyte salt, a halocarbon cathode depolarizer, and an inert, slightly polar cosolvent as disclosed above; a catalyzed carbon cathode containing finely divided particles of a cobalt, nickel, or iron macrocylic ligand catalyst as disclosed above; and a housing for these components. A typical cell design is used in the examples which follow.

The general nature of the invention having been set forth, the following examples are presented as specific illustrations thereof. It will be understood that the invention is not limited to these specific examples, but is susceptible to various modifications that will be recognized by one of ordinary skill in the art.

EXAMPLES

Figure 2:
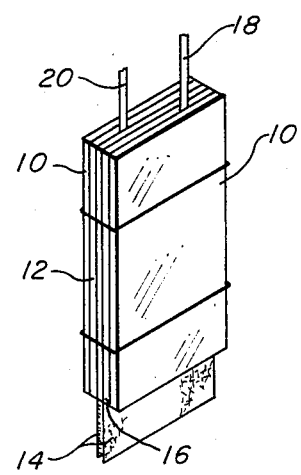
FIG. 2 shows the test cell as assembled.

Catalysts were incorporated into cathodes by blending finely divided powders of catalyst, Teflon (polytetrafluoroethylene:PTFE) as a binder, and carbon black (Shawinigan acetylene black) in a Stoddards Solvent medium, filtering, kneading, and rolling down to a thin sheet in a dry room. The cathode sheet was then vacuum-oven dried and mounted on nickel Exmet. The discharge behavior of halocarbon electrolytes at these cathodes versus lithium was characterized in prismatically arranged, two plate battery packs. FIG. 1 shows the components of a typical battery pack which comprised a 1.00"×0.50" (3.2 cm$^2$) electrode of lithium as the anode 12 and a 1.00"×.50" (3.2 cm$^2$) electrode of catalyzed carbon as the cathode 16 separated by two 0.007" thick layers of glass-fiber separator paper 14. The battery pack was secured between two glass plates 10 and the assembly was bound together with nickel wire. FIG. 2 shows the assembled battery pack with lead 18 connected to the cathode 16 and lead 20 connected to the anode 12. The glass plates 10 and the separator paper 14 are also shown. The pack was suspended in an argon-filled Pyrex test tube above a layer of electrolyte which entered the pack by wicking up the separator paper protruding from the bottom of the pack. Electrolytes consisted of halocarbon liquids mixed with cosolvents (normally tetrahydrofuran, THF, but sometimes methyl formate, MF) and made conductive normally with 1M lithium hexafluoroarsenate. Discharges were done at constant current corresponding normally to a current-density of 1 mA.cm$^{-2}$.

The criteria for successful catalysis is the raising of the voltage level of the constant current discharge plateau. This is characterized in Table 1 by the mid-discharge cell voltage, the voltage at half the time taken for cell voltage to fall to 0.8 V. Discharge capacities are not discussed in Table 1. They were generally in the vicinity of 2 Ah/g of carbon black. Neither the coulombic capacity nor the mechanical integrity of cathodes was substantially affected by the presence of catalyst. The catalysts tested were finely-divided transition metals or organometallic complexes thereof.

The listed catalyst weight percentages are based on the weight of carbon black plus catalyst plus Teflon in the cathode. On the same basis, Teflon weight percentage was 5.0. Unless otherwise stated all discharges were done with Shawinigan Acetylene Black cathodes in 50 volume % halocarbon/5 volume % THF, 1M in $LiAsF_6$ at $1mA.cm^{-2}$ and $25\pm1°$ C. The examples in Table 1 are listed in order of increasing effectiveness of catalysis.

TABLE 1

| EXAMPLE | HALOCARBON | MID-DISCHARGE LITHIUM CELL VOLTAGE | | CATALYST[1,2] |
|---|---|---|---|---|
| | | Uncatalysed | Catalysed | |
| 1 | Methylene chloride $CH_2Cl_2$ | 1.2 | 1.3 | 5% CoTAA |
| 2 | Hexafluorobenzene $C_6F_6$ | 1.3 | 1.6 | 2% CoTAA |
| 3 | 1,2-dichloro-1,1-difluoroethane $CClF_2CH_2Cl$ | 1.3 | 1.5 | 2% CoTAA |
| | 1,2-dichloro-1,1-difluoroethane $CClF_2CH_2Cl$ | 1.3 | 1.95 | 10% CoPc |
| 4 | 1,2-dichloroethane $CH_2ClCH_2Cl$ | 1.2 | 1.65 | 5% CoTAA |
| | 1,2-dichloroethane $CH_2ClCH_2Cl$ | 1.2 | 1.78 | 10% CoPc |
| 5 | 1,1,2,2-tetrachloroethane $CHCl_2CHCl_2$ | 1.5 | 1.4 | 25% Ni |
| 6 | 1,1,2,2-tetrachloroethane $CHCl_2CHCl_2$ | 1.5 | 1.5 | 25% Fe |
| 7 | 1,1,2,2-tetrachloroethane $CHCl_2CHCl_2$ | 1.5 | 1.8 | 20% Cu |
| 8 | 1,1,2,2-tetrachloroethane $CHCl_2CHCl_2$ | 1.5 | 1.8 | 25% Pt |
| 9 | 1,1,2,2-tetrachloroethane $CHCl_2CHCl_2$ | 1.5 | 2.0 | 25% Rh |
| 10 | 1,1,2,2-tetrachloroethane $CHCl_2CHCl_2$ | 1.5 | 2.1 | 25% Pd |
| 11 | 1,1,2,2-tetrachloroethane $CHCl_2CHCl_2$ | 1.5 | 2.1 | 10% NiPc |
| 12 | 1,1,2,2-tetrachloroethane $CHCl_2CHCl_2$ | 1.5 | 2.2 | 10% FePc |
| 13 | 1,1,2,2-tetrachloroethane $CHCl_2CHCl_2$ | 1.5 | 2.2 | 2% CoTAA |
| | 1,1,2,2-tetrachloroethane $CHCl_2CHCl_2$ | 1.5 | 2.4 | 5% CoTAA |
| | 1,1,2,2-tetrachloroethane $CHCl_2CHCl_2$ | 1.5 | 2.3 | 25% CoTAA |
| 14 | 1,1,2,2-tetrachloroethane $CHCl_2CHCl_2$ | 1.5 | 2.2 | 5% CoTMPP |
| | 1,1,2,2-tetrachloroethane $CHCl_2CHCl_2$ | 1.5 | 2.3 | 10% CoTMPP |
| 15 | 1,1,2,2-tetrachloroethane $CHCl_2CHCl_2$ | 1.5 | 2.4 | 2% CoPc |
| | 1,1,2,2-tetrachloroethane $CHCl_2CHCl_2$ | 1.5 | 2.4 | 10% CoPc |

[1]The catalyst percentages are weight percents based on the total weight of the catalyst plus carbon plus Teflon binder.
[2]Abbreviations used for organometallic complexes are:
CoTAA for cobalt dibenzotetraaza-[14]-annulene
NiPc for nickel phthalocyanine
FePc for ion phthalocyanine
CoPc for cobalt phthalocyanine
CoTMPP for cobalt tetramethoxyphenylporphyrin Obviously, numerous modifications and variations of the present invention are possible in light of the above teachings. It is therefore to be understood that, within the scope of the appended claims, the invention may be practiced otherwise than as specifically describe.

What is claimed is:
1. A non-aqueous electrochemical cell comprising:
   a. a lithium anode;
   b. a non-aqueous electrolyte comprising
      (1) a lithium electrolyte salt, and
      (2) a solvent mixture comprising
         (a) a halocarbon cathode depolarizer selected from the group consisting of 1,2-dichloroethane, 1,1,2-trichloroethane, 1,1,2,2-tetrachloroethane, 1,2-dichloro-1,1-difluoroethane, and mixtures thereof, and
         (b) an inert, slightly polar cosolvent which increase the solubility of the lithium electrolyte salt;
   c. a catalyzed carbon cathode containing from more than zero to 30 weight percent of a catalyst selected from the group consisting of:
      copper,
      rhodium,
      palladium,
      cobalt phthalocyanine,
      nickel phthalocyanine,
      iron phthalocyanine,
      cobalt tetraaza-[14]-annulenes,
      nickel tetraaza-[14]-annulenes,
      iron tetraaza-[14]-annulenes,
      cobalt porphyrins,
      nickel porphyrins,
      iron porphyrins, and mixtures thereof; and
   d. a separator between the anode and the cathode.

2. A non-aqueous electrochemical cell according to claim 1 wherein the halocarbon cathode-depolarizer is selected from the group consisting of 1,2-dichloroethane, 1,1,2-trichloroethane, 1,1,2,2-tetrachloroethane and mixtures thereof.

3. A non-aqueous electrochemical cell according to claim 2 wherein the halocarbon cathode-depolarizer is 1,1,2,2-tetrachloroethane.

4. A non-aqueous electrochemical cell according to claim 1 wherein the cosolvent is selected from the group consisting of tetrahydrofuran and methyl formate.

5. A non-aqueous electrochemical cell according to claim 4 wherein the cosolvent is tetrahydrofuran.

6. A non-aqueous electrochemical cell according to claim 4 wherein the cosolvent is methyl formate.

7. A non-aqueous electrochemical cell according to claim 1 wherein from about 25 to 50 volume percent of cosolvent is used in the solvent mixture.

8. A non-aqueous electrochemical cell according to claim 1 wherein the concentration of lithium salt in the non-aqueous electrolyte is from about 0.5 to about 2.0M.

9. A non-aqueous electrochemical cell according to claim 8 wherein the concentration of lithium salt in the non-aqueous electrolyte is from 1.0 to 1.5M.

10. A non-aqueous electrochemical cell according to claim 1 wherein the lithium electrolyte salt is lithium hexafluoroarsenate, $LiAsF_6$.

11. A non-aqueous electrochemical cell according to claim 1 wherein the catalyst is selected from the group consisting of cobalt phthalocyanine, nickel phthalocyanine, iron phthalocyanine, cobalt dibenzotetraaza-[14]-annulene, nickel dibenzotetraaza-[14]-annulene, iron dibenzotetraaza-[14]-annulene, cobalt 4,4'-dimethoxydibenzotetraaza-[14]-annulene, nickel 4,4'-dimethoxydibenzotetraaza-[14]-annulene, iron 4,4'-dimethoxydibenzotetraaza-[14]-annulene, cobalt tetramethoxyphenylporphyrin, nickel tetramethoxyphenylporphyrin, and iron tetramethoxyphenylporphyrin.

12. A non-aqueous electrochemical cell according to claim 11 wherein the catalyst is selected from the group consisting of cobalt phthalocyanine, cobalt dibenzotetraaza-[14]-annulene, cobalt 4,4'-dimethoxydibenzotetraaza-[14]-annulene, and cobalt tetramethoxyphenylporphyrin.

13. A non-aqueous electrochemical cell according to claim 12 wherein the catalyst is cobalt dibenzotetraaza-[14]-annulene.

14. A non-aqueous electrochemical cell according to claim 1 wherein the catalyst is a metal selected from the group consisting of copper, rhodium, palladium, and mixtures thereof.

15. A non-aqueous electrochemical cell according to claim 1 wherein the catalyst comprises from 2 to 15 weight percent of the catalyzed carbon cathode.

16. A non-aqueous electrochemical cell according to claim 15 wherein the catalyst comprises from 5 to 10 weight percent of the catalyzed carbon cathode.

* * * * *